US009251801B2

(12) United States Patent
Grand

(10) Patent No.: US 9,251,801 B2
(45) Date of Patent: Feb. 2, 2016

(54) METHOD FOR RENDERING A MUSIC SIGNAL COMPATIBLE WITH A DISCONTINUOUS TRANSMISSION CODEC; AND A DEVICE FOR IMPLEMENTING THAT METHOD

(75) Inventor: Jean-Yves Grand, Orvault (FR)

(73) Assignee: Alcatel Lucent, Boulogne-Billancourt (FR)

( * ) Notice: Subject to any disclaimer, the term of this patent is extended or adjusted under 35 U.S.C. 154(b) by 908 days.

(21) Appl. No.: 13/389,170

(22) PCT Filed: Jul. 20, 2010

(86) PCT No.: PCT/EP2010/060455

§ 371 (c)(1), (2), (4) Date: Feb. 28, 2012

(87) PCT Pub. No.: WO2011/026685

PCT Pub. Date: Mar. 10, 2011

(65) Prior Publication Data

US 2012/0158164 A1 Jun. 21, 2012

(30) Foreign Application Priority Data

Sep. 2, 2009 (FR) ..................................... 09 55963

(51) Int. Cl.

| | |
|---|---|
| ***G06F 17/00*** | (2006.01) |
| ***G10L 19/26*** | (2013.01) |
| *G10L 25/78* | (2013.01) |
| *G10L 19/012* | (2013.01) |
| *G10L 25/81* | (2013.01) |

(52) U.S. Cl.

CPC ........ *G10L 19/265* (2013.01); *G10H 2210/046* (2013.01); *G10L 19/012* (2013.01); *G10L 25/81* (2013.01); *G10L 2025/783* (2013.01)

(58) Field of Classification Search

None

See application file for complete search history.

(56) References Cited

U.S. PATENT DOCUMENTS 6,633,841 B1 * 10/2003 Thyssen .................. G10L 25/78 375/242
8,538,565 B2 * 9/2013 Kawakami et al. ............. 700/94
2005/0250554 A1 11/2005 Chen et al.
2008/0008298 A1 1/2008 Kirla

FOREIGN PATENT DOCUMENTS

WO WO-0109878 A1 2/2001
WO WO-2008003834 A1 1/2008

OTHER PUBLICATIONS

International Search Report.

* cited by examiner

*Primary Examiner* — Fan Tsang
*Assistant Examiner* — David Siegel
(74) *Attorney, Agent, or Firm* — Harness, Dickey & Pierce, P.L.C.

(57) ABSTRACT

In one embodiment, the method for rendering a music signal compatible with a discontinuous transmission codec includes detecting a period of silence within an initial music signal, producing an auxiliary audio signal whose amplitude is less than that of the initial signal outside of the period of silence, but sufficient to not be detectable as silence by a discontinuous transmission codec, and replacing the initial music signal with the auxiliary signal during the period of silence.

7 Claims, 4 Drawing Sheets

METHOD FOR RENDERING A MUSIC SIGNAL COMPATIBLE WITH A DISCONTINUOUS TRANSMISSION CODEC; AND A DEVICE FOR IMPLEMENTING THAT METHOD

The invention pertains to a method for rendering a music signal compatible with a discontinuous transmission codec, such as is found in telecommunications networks, in particular networks using the Internet protocol. A codec has the particular function of converting an audio signal into a digital signal. Some codecs are called discontinuous transmission codecs because they include a voice activity detector which detects the period of silence and prevents the encoding of the audio signal during these periods of silence. Thus, the use of resources to transmit data which actually represents only background noise is avoided. More precisely, a brief indication of silence is transmitted, which orders, in the remote decoder, the production of an artificial noise, for the listener's comfort.

If it is desired to transmit a music signal within an audio channel which goes through such a discontinuous transmission codec, the music signal is interrupted every time that a drop in amplitude is interpreted as silence by the voice activity detection circuit. Such a codec is therefore incompatible with the transmission of a music signal. This is very bothersome if it is desired to transmit music during an advertising message, or while a user is on hold, for example.

One known solution consists of commanding the codec from the application that is to produce a music signal, so as to inhibit the detection of periods of silence while that application is sending a music signal to the codec. However, this solution is only applicable if the application which produces the music signal can send such a command signal to the codec. This is not possible if the codec is remote.

The purpose of the invention is to render a music signal compatible with a discontinuous transmission codec, even if the application which produces that signal is not capable of inhibiting within that codec the detection of the periods of silence while that application is sending a music signal to the codec.

The object of the invention is a method for rendering a music signal compatible with a discontinuous transmission codec, comprising the steps of:

- detecting a period of silence in an initial music signal,
- producing an auxiliary audio signal whose amplitude is less than that of the initial signal during periods of silence, but is sufficient to not be detectable as silence, by a discontinuous transmission codec,
- and replacing the initial music signal with the auxiliary signal during the period of silence.

The method thereby characterized renders a music signal compatible with a discontinuous transmission codec because the final signal still has sufficient amplitude not to be detectable as silence by a discontinuous transmission codec.

Another object of the invention is a device for rendering a music signal compatible with a discontinuous transmission codec, which comprises means for implementing the inventive method.

The invention will be better understood and other characteristics will become apparent with the help of the description below and the accompanying figures:

FIG. 1 depicts:

Figure 1:
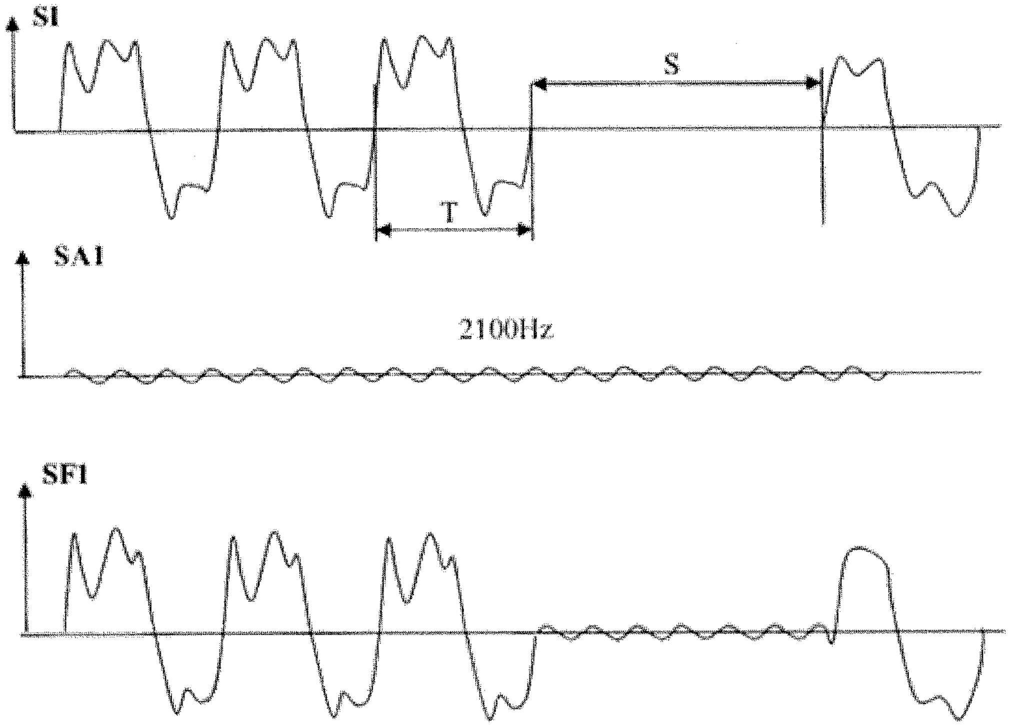
FIG. 1 depicts graphs which illustrate a first variant of the inventive method.
Figure 2:
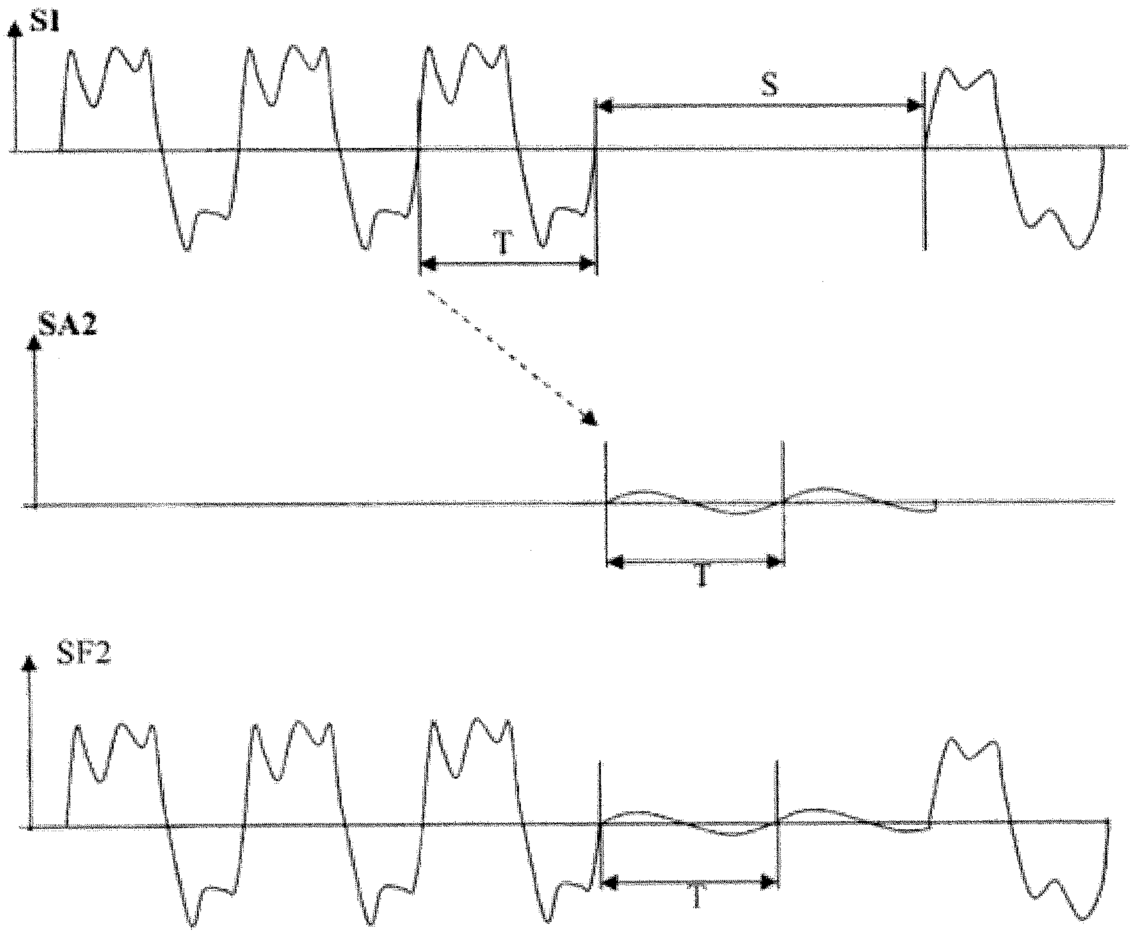
FIG. 2 depicts graphs which illustrate a second variant of the inventive method.
Figure 3:
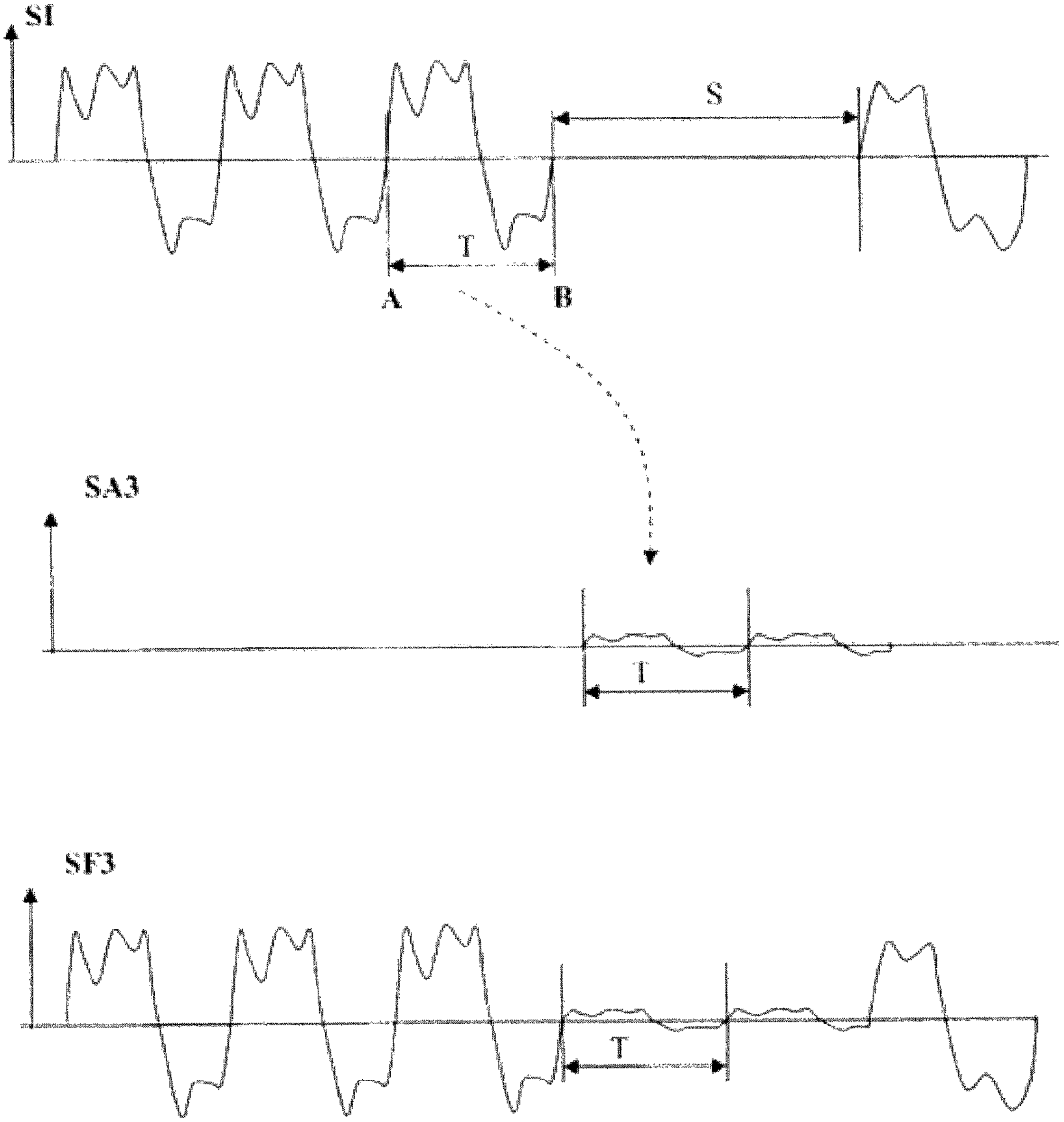
FIG. 3 depicts graphs which illustrate a third variant of the inventive method.

- the graph of an initial music signal SI,
- the graph of an auxiliary signal SA1, a sine wave, which is used for implementing the first variant of the inventive method,
- and the graph of a final music signal SF1, after the implementation of the inventive method.

During a period of silence S, the final signal SF1 is obtained by replacing the initial signal SI (background noise) with the auxiliary signal SA1 which is preferably a sine wave signal of a predetermined amplitude that is low compared to the amplitude of the initial signal SI, and a fixed frequency, equal to 2100 Hz plus or minus 15 Hz (the signal conventionally used to block an echo canceller). In another example, the frequency used is equal to 2093 Hz and corresponds to the musical note MI in the seventh octave. The auxiliary signal SA1 is produced by conventional means, for example a signal processor running a conventional program.

FIG. 2 depicts:

- the graph of an initial music signal SI,
- a graph of an auxiliary signal SA2, a sine wave, which is used for implementing the second variant of the inventive method,
- and the graph of a final music signal SF1, after implementing the second variant of the inventive method.

During the period of silence S, the final signal SF2 is obtained by replacing the initial signal SI (background noise) with the auxiliary signal SA2 which is preferentially a sine wave signal whose amplitude is low compared to the initial signal SI, and whose frequency is variable, equal to 1/T where T is the fundamental frequency period of the initial signal SI just before the period of silence S.

This frequency is determined conventionally by a signal processor, by means of a Fourrier transform. Next, this processor produces a sine wave signal at that frequency, by running a conventional program. This auxiliary signal SA2 replaces the initial signal SI during the periods of silence.

According to another embodiment, the auxiliary signal is a periodic signal, but not a sine wave signal, which is the sum of multiple sine wave signals, each one having a low amplitude compared to the initial signal SI, and frequencies respectively equal to multiples of 1/T:

1/T, 2/T, 3/T, etc.

FIG. 3 depicts:

- the graph of an initial music signal SI,
- the graph of an auxiliary signal SA3, which is used for implementing the third variant of the inventive method,
- and the graph of a final music signal SF3, after the implementation of the third variant of the inventive method.

During the period of silence S, the final signal SF3 is obtained by replacing the initial signal SI (background noise) with an auxiliary signal which is preferentially equal to the initial signal SI, just before the period of silence S, but with a greatly reduced amplitude. According to one embodiment, this auxiliary signal is determined by recording the initial signal SI in a sliding time window, and by extracting from this recording a music signal period AB, occurring just before the period of silence S. When a period of silence S is detected, the music signal period AB is determined just before the period of silence S in the recording by detecting two successive passes through zero, in a conventional manner, by a signal processor. Next, this processor rereads the recording of the period AB repeatedly, and plays it back with a reduced amplitude, in order to fill the entire period of silence S.

According to another embodiment, the auxiliary signal SA3 is obtained by running the initial signal SI through a conventional reverberation circuit, the reverberation duration being chosen as greater than the maximum duration of the periods of silence. This auxiliary signal SA3 replaces the initial signal SI during the periods of silence.

In all of these embodiments, the auxiliary signal has an amplitude less than that of the initial signal SI, outside of the periods of silence, but one high enough to not be detectable as silence, by a discontinuous transmission codec. The relative level of the auxiliary signal may, for example, be −31 dB.

Figure 4:
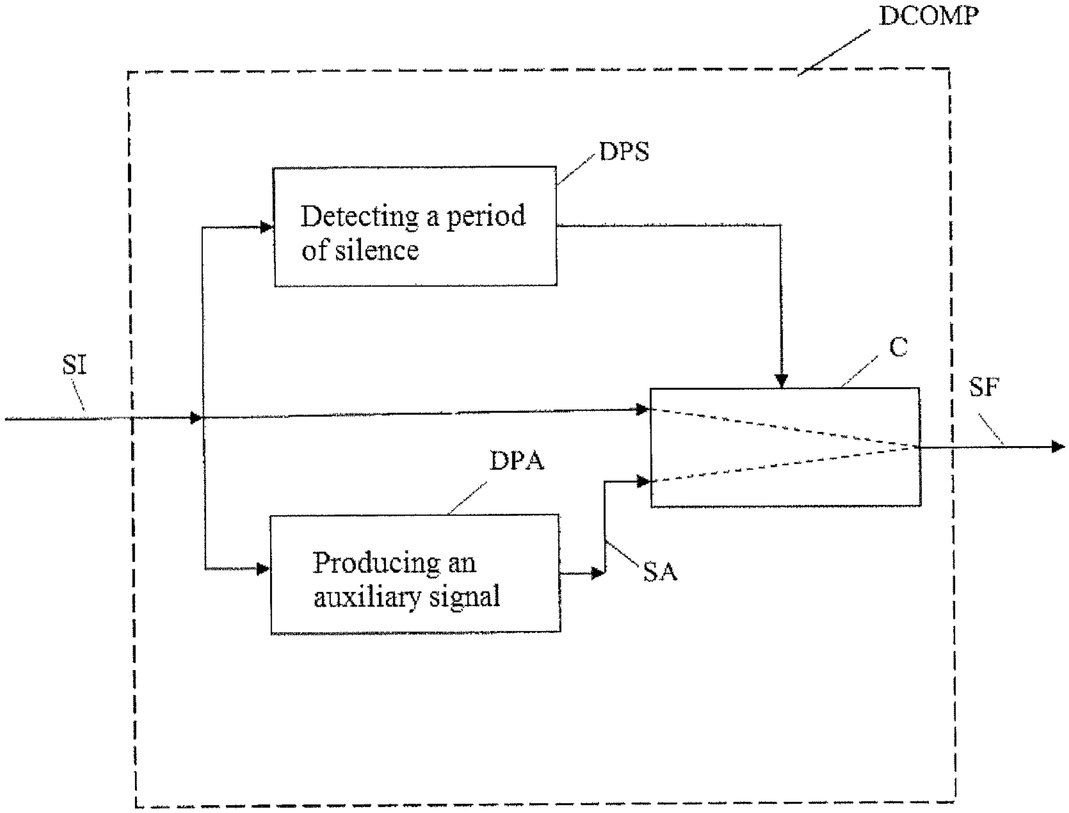
FIG. 4 depicts an example embodiment of the inventive device.

FIG. 4 functionally depicts an example embodiment of the inventive device DCOMP, which comprises:

an input receiving the initial signal SI, a device DPS for detecting a period of silence, a device DPA for producing an auxiliary signal, a switching device C having first and second inputs, an output, and a command input, and an output which provides a final signal SF.

The initial signal SI is applied to an input of the device DPS for detecting a period of silence, to an input of the device DPA for producing an auxiliary signal, and to the first input of the switching device C. An output of the device DPS for detecting a period of silence is connected to the input of the command of the switching device C. An output of the device DPA for producing an auxiliary signal is connected to the second input of the device DPS for detecting a period of silence. The output of the switching device C constitutes the output which provides a final signal SF.

When the device DPS for detecting a period of silence does not detect a period of silence, it orders the switching device C to transmit the initial signal SI to the output of the device DCOMP.

When the device DPS for detecting a period of silence detects a period of silence, it orders the switching device C to transmit the auxiliary signal to the output of the device DCOMP throughout the duration of the entire period of silence.

These devices DPS and DPA may be constructed in the form of a signal processor equipped with a program, or in the form of cabled circuits. The device for producing an auxiliary signal comprises means for implementing one of the variants of the inventive method, as described above.

The invention claimed is:

1. A method for rendering a music signal compatible with a discontinuous transmission codec, comprising:

detecting, by at least one processor, a false period of silence within an initial music signal, the initial music signal including at least a first period of sound, the false period of silence including sound with a maximum amplitude that is low enough that the discontinuous transmission codec incorrectly detects the false period of silence as silence, producing, by the processor, an auxiliary audio signal with an amplitude that is less than an amplitude of the first period of sound, but sufficient not to be detectable as silence, by the discontinuous transmission codec, and replacing, by the processor, the false period of silence within the initial music signal with the auxiliary audio signal.

2. A method according to claim 1, wherein the production of an auxiliary audio signal comprises generating a sine wave signal having a singular frequency.

3. A method according to claim 1, wherein the production of an auxiliary audio signal comprises:

determining a duration T of a period of the initial music signal before the false period of silence, and generating a sine wave signal with a frequency equal to 1/T.

4. A method according to claim 1, wherein the production of an auxiliary audio signal comprises:

determining a duration T of a period of the initial music signal before the false period of silence, generating a plurality of sine wave signals laving frequencies respectively equal to multiples of 1/T, and adding the plurality of sine wave signals together to constitute the auxiliary audio signal.

5. A method according to claim 1, wherein the production of an auxiliary audio signal comprises:

recording the initial music signal, and during the false period of silence of the initial music signal, rereading part of that recording, which part corresponds to the initial music signal before the false period of silence.

6. A method according to claim 5, wherein the rereading of a part of that recording, corresponding to the initial music signal before the false period of silence, comprises:

determining two successive passes through zero of the initial music signal for delimiting a music signal period in the initial music signal before the false period of silence, and rereading the recording of that music signal period repeatedly in order to fill the entire false period of silence.

7. A device for rendering a music signal compatible with a discontinuous transmission codec, comprising means for implementing the method according to claim 1.

* * * * *